UNITED STATES PATENT OFFICE.

FELIX A. VOGEL, OF NEW YORK, N. Y., ASSIGNOR TO GENERAL BRIQUETTING COMPANY, OF NEW YORK, N. Y., A CORPORATION OF MAINE.

BRIQUETING FLUE-DUST.

1,312,218. Specification of Letters Patent. Patented Aug. 5, 1919.

No Drawing. Application filed October 26, 1918. Serial No. 259,806.

*To all whom it may concern:*

Be it known that I, FELIX A. VOGEL, a citizen of the United States, and a resident of the borough of Manhattan, city, county, and State of New York, have invented certain new and useful Improvements in Briqueting Flue-Dust, of which the following is a specification.

The present invention relates to a process of briqueting flue dust, and is, in its more specific application, concerned with the utilization of the heretofore useless product known as wet flue dust, i. e., a treatment of such flue dust which will cause it to become part of a commercially useful briquet.

Wet flue dust as it comes from the scrubbers is a very fine dust and, consequently, when carried in water, difficult to handle. The bulk of it is high in iron which has been reduced to the lowest oxid of iron, together with a smaller proportion of slag forming impurities. The main difficulty in recovering such wet dust lies in the presence of water, of which there is approximately 85–95% with the flue dust as it comes from the scrubbers. This water cannot economically be evaporated and the usual practice has been to permit it to run away with the dust.

According to my process I first remove as much water as possible by mechanical processes, such as the employment of settling tanks, as the result of which the moisture can be reduced to approximately 40–60%. I can also employ a Dorr thickener or filter presses whereby the masses thicken to approximately 30–50% moisture. Even with these reduced percentages of water it is not commercial to evaporate the remaining quantities of water. I, therefore, after the mechanical reduction of water, mix the remaining wet flue dust with 2 to 4 parts of dry flue dust (from the dust catchers) under special conditions of treatment. Mere mixing is insufficient since the dry and wet dusts do not mix well or evenly and, consequently, will not produce a uniform product or result. For my purposes there may be a preliminary mixing which may take place in a screw conveyer but this does not by itself perform the office of my next step. The mass of unevenly mixed material is fed by the conveyer to a machine of the edge runner type but differing from the usual edge runner in having broad, wide rimmed wheels or chasers.

The operation which ensues under these conditions, is one which thoroughly and intimately mixes the dry and the wet dust while simultaneously grinding and masticating the particles so that the pulp becomes even and uniform throughout with the moisture contents distributed uniformly with respect to the particles which were originally wet and the particles of dust which were added in a dry condition. The masticating operation also exposes portions of the interior of the wet dust particles which seem to acquire almost immediately upon exposure an activity favorable to the creation of binding conditions. The action of the mastication is carried on until the entire mass has acquired a condition of coherence and a cementing facility, after which time the material is in a condition of a useful, workable product which may be briqueted or otherwise used.

It is apparent that according to this process no effort is made, after the preliminary mechanical treatments, to remove the moisture from the wet flue dust except in the sense of distributing such moisture to a larger volume of dry flue dust until the entire mass contains moisture only in negligible proportions per unit of solid matter, say 10–12%, a proportion in which, I have found, the water is not only not injurious but positively advantageous since it then participates in the creation of the cementing facility of the mixture.

The dry flue dust which is added may be either hot or cold, and a catalyst or other substance such, for example, as described in U. S. Letters Patent Nos. 933,269 or 933,270 of September 7, 1909, may or may not be added according to the wishes of the operator. The ultimate product which I obtain possesses the quality of becoming hard, in time, by setting. Presumably there is a catalytic effect which develops out of the procedure employed. At any rate, the method of procedure used by me results in a material which possesses great utility, and while inexpensive to produce, contains the full flue dust value of the wet pulp while also developing an additional force favorable to permanent coherence in the briquet.

My process should not be confounded with that of moistening dry flue dust; moistened dry flue dust possesses no substantial cohering nor cementing qualities, nor will it set in any manner like that which is inherent in my product but at best it hardens only in lumps and is not in a workable condition for further operations.

If, however, the dry flue dust is subjected to the masticating action described with water present during said treatment, then the conditions of the treatment of mixed wet and dry flue dust are to a certain extent reproduced and while in this case the valuable individual properties of the wet flue dust are not developed or present, a satisfactory briquet will nevertheless result, especially when a catalytic substance is present during the treatment in the masticator. Similarly, if wet dust after being reduced to a pulp by a mechanical reduction of the water contents,—as by a filter press—is treated in the masticator under conditions such that the excess water squeezed out of the solid matter is withdrawn until the moisture is reduced to approximately 10 to 14%, then again there will be reproduced a situation approximating the conditions where wet and dry flue dust are first mixed. Here again a satisfactory briquet will result although it will obviously not contain particles corresponding to those supplied from a source of dry flue dust. The essence of my process consists, therefore, broadly in the treatment of flue dust under conditions where the particles thereof are split or fractured to expose interior surfaces, as by grinding or crushing, and where during such crushing there is present moisture in relatively small but nevertheless substantial proportions and where also the moist split particles are at once kneaded or masticated until a uniformly distributed cementing facility is obtained. In the special application of the invention to a mixture of wet and dry flue dust the invention contemplates not only the addition of sufficient dry flue dust to render the proportion of diluting water in the entire mass negligible, but in carrying out the effective mixing operation under conditions where there is simultaneous mastication under relatively severe pressure in the presence of enough moisture to facilitate the conversion of the mass into a briquetable substance.

What I claim is:

1. The process of treating flue dust which consists in subjecting it in the presence of a relatively small volume of water to a crushing action whereby interior surfaces of the flue dust particles are exposed and simultaneously mixing and masticating the mass until the moisture is uniformly distributed among the particles with their newly exposed surfaces and until the entire mass as thus treated has acquired a cohering or cementing characteristic and facility.

2. The process of treating flue dust which consists in subjecting it in the presence of a relatively small volume of water and a substance capable of stimulating a catalytic action to a crushing action whereby interior surfaces of the flue dust particles are exposed and simultaneously mixing and masticating the mass until the moisture and the catalytic agent are uniformly distributed among the particles with their newly exposed surfaces and until the entire mass as thus treated has acquired a cohering or cementing characteristic and facility.

3. The process of treating wet flue dust which consists in mixing it with an excess of material in the form of relatively dry particles and subjecting the mixture to a grinding, mixing and masticating action until the dry and wet particles are intimately and uniformly mixed and the water contents of the mixture is uniformly distributed throughout and the mass has acquired a cohering or cementing characteristic and facility.

4. The process of treating wet flue dust which consists in mixing it with an excess of material in the form of relatively dry particles and subjecting the mixture to a grinding, mixing and masticating action until the dry and wet particles are intimately and uniformly mixed and the water contents of the mixture is uniformly distributed throughout and the mass has acquired a cohering or cementing characteristic and facility and then briqueting the product.

5. The process of treating wet flue dust which consists in mechanically extracting readily removable surplus water therefrom and thus reducing it to a pulp, then mixing the pulp with an excess of material in the form of relatively dry particles and subjecting the mixture to a grinding, mixing and masticating action until the dry and wet particles are intimately and uniformly mixed and the water contents of the mixture is uniformly distributed throughout and the mass has acquired a cohering or cementing characteristic and facility and then briqueting the product.

In testimony whereof I have hereunto set my hand.

FELIX A. VOGEL.

Copies of this patent may be obtained for five cents each, by addressing the "Commissioner of Patents, Washington, D. C."